United States Patent Office 3,201,480
Patented Aug. 17, 1965

3,201,480
PROCESS FOR THE CONTINUOUS PRODUCTION OF TRI- AND POLY-BASIC ALCOHOLS
Harry Danziger, Krefeld-Bockum, and Karl Haeseler, Krefeld-Uerdingen, Germany, assignors to Farbenfabriken Bayer Aktiengesellschaft, Leverkusen, Germany, a corporation of Germany
No Drawing. Filed Jan. 8, 1963, Ser. No. 250,021
Claims priority, application Germany, June 4, 1959, F 28,613
3 Claims. (Cl. 260—635)

This application is a continuation-in-part of our previously copending application Serial No. 31,264 as filed May 24, 1960, and now abandoned.

The present invention is concerned with an improved continuous process for the production of polyhydric alcohols. It is known to produce polyhydric alcohols by condensing batchwise about equimolecular amounts of formaldehyde and higher aliphatic aldehydes in alkaline medium. In order to avoid the formation of undesired by-products, however, these processes must be carried out at relatively low temperatures, so that the time required for complete reaction usually is too long as to perform such processes in a technical simple manner.

It is also known to effect the above mentioned condensation reactions continuously. If, however, the reaction components are used in stoichiometrical amounts as known from the batchwise processes a number of undesired by-products is formed in considerable amounts. It is known that in the continuous process the formation of these by-products can be suppressed by the use of a significant excess of formaldehyde, that excess usually being substantially more than 10 percent with respect to the theoretical amount.

We have now found that in the process for the continuous production of polyhydric alcohols by condensation of formaldehyde with another aliphatic aldehyde selected from the group consisting of acetaldehyde, propionic aldehyde, butyraldehyde, iso-valeryl aldehyde and oenanthic aldehyde, in the presence of an alkaline condensation agent selected from the group consisting of an aqueous solution of lithium, sodium and potassium hydroxide and an aqueous suspension of calcium and barium hydroxide, the formation of these by-products can be suppressed to a substantial degree without the use of an excess of formaldehyde or with an excess of formaldehyde not higher than about 10 percent, if the continuous production process is carried out in several reaction steps whereby in the first stage the total amount of formaldehyde is introduced with less than the necessary amount of the condensation agent and of the other aliphatic aldehyde, the condensation agent, however, being present in excess with respect to the other aliphatic aldehyde, then condensation agent and the other aliphatic aldehyde, again with the use of an excess of condensation agent, are added in at least one of the following stages and, finally, the remaining amount of the other aliphatic aldehyde is added in one of the last stages.

When carrying out the process in, for instance, three stages, there are introduced, for example, expediently in the first stage, apart from the total amount of formaldehyde to be introduced, optionally about 40–70 percent of the condensation agent and about 30 to about 50 percent of the other aliphatic aldehyde, in the second stage the remainder of the condensation agent, and about 45 to 30 percent of the other aliphatic aldehyde and, finally, in the third stage the remainder of the other aliphatic aldehyde.

In the case of this process, it is sufficient to introduce the theoretically required amount of formaldehyde in total. However, it is recommended to use a slight excess, for example, of 5–10 percent.

When carrying out the process of the present invention in 4 stages the above mentioned 3 stages procedure is followed except that the second stage is divided into 2 separate stages 2 and 3 respectively. In the second stage there are added to the reaction mixture, for example, only about 15 to about 30 percent of the condensation agent and only about 35 to 25 percent of the other aldehyde. Thereafter in the third stage there are added the remainder of the condensation agent and about 20 to 15 percent of the other aldehyde. Finally in the fourth stage of that process the remainder of the other aldehyde is added to the reaction mixture.

According to the present process, there can be produced with advantage, for example, trimethylol-ethane from propionic aldehyde, trimethylol propane from butyraldehyde, trimethylol-butane from valeryl aldehyde, trimethylol-hexane from oenanthol and pentaerythritol from acetaldehyde, and formaldehyde.

In general, the process of the present invention can be carried out at slightly elevated temperatures. The most useful reaction temperature depends on the reaction components, especially on the molecular weight of the higher aliphatic aldehyde, and can be determined by simple experiments. For example, suitable reaction temperatures range from about 30 to about 90° C. Preferably the reaction of lower aldehydes is carried out at a temperature of up to about 60°, and of higher aldehydes in the range between about 60 and about 90° C.

The following examples are given for the purpose of illustrating the present invention:

Example 1

(A) 200 kg. formaldehyde (30 percent by weight aqueous solution), 16.0 kg. calcium hydroxide (96 percent $Ca(OH)_2$, 59.3 percent of the total amount) and 20.3 kg. butyraldehyde (95 percent $C_4H_8O$, 42.3 percent of the total amount) are introduced per hour continuously into a reaction vessel provided with a stirring device.

The mixture is continuously circulated through a cooler, i.e. is pumped out of and back into the vessel. The mixture flows from the first container through an overflow into a second container provided with stirring means into which second container there are added continuously further 11.0 kg. calcium hydroxide (40.7 percent of the total amount) and 21.5 kg. butyraldehyde (44.8 percent of the total amount) per hour. This mixture is also circulated by a pump through a cooler and passed from the second container into a third vessel into which are added continuously 6.2 kg. butyraldehyde (12.9 percent of the total amount) per hour. The temperature in all three vessels is maintained at 44–47° C. The average time of stay in the three vessels amounts to 11, 10 and 9 minutes, respectively.

The mixture is subsequently continuously acidified with formic acid to a pH of 5.5 to 6.0. After the usual working-up, 83.2 kg. (98.1 percent of theory) of crude trimethylolpropane are obtained. 70.0 kg. (82.5 percent of theory) of distilled product of solidification point greater than 57° C. are obtained therefrom.

(B) When the reaction mixture consisting of 200 kg. formaldehyde (30 percent by weight aqueous solution), 27 kg. calcium hydroxide (96 percent by weight $Ca(OH)_2$) and 20.3 kg. butyraldehyde (95 percent by weight $C_4H_8O$) is reacted in only one stage with stirring at a reaction temperature of 45° C. within 30 minutes, as a result of the formation of considerable amounts of by-products the yield of crude trimethylol-propane is lower than about 78 percent of theory. In addition the trimethylolpropane obtained after distillation of the crude reaction product is still impure and shows a solidification point as low as 57° C.

Example 2

200 kg. formaldehyde (30 percent by weight solution), 14.9 kg. calcium hydroxide (96 percent Ca(OH)$_2$, 55 percent of the total amount) and 21.6 kg. butyraldehyde (95 percent C$_4$H$_8$O, 45 percent of the total amount) are introduced per hour continuously into a reaction vessel provided with a stirring device. The mixture is continuously circulated through a cooler, e.g. is pumped out of and back into the vessel and flows from the first container through an overflow into the second container provided with stirring means. Into said second container there are added continuously further 8.1 kg. calcium hydroxide (30 percent of the total amount) and 12.0 kg. butyraldehyde (25 percent of the total amount) per hour. This mixture is also cooled in the manner indicated above and flows from the second container into the third vessel into which there are added continuously 4.0 kg. calcium hydroxide (15 percent of the total amount) and 9.6 kg. butyraldehyde (20 percent of the total amount). This mixture is also cooled as indicated above and passed into a fourth vessel into which there are added continuously 4.8 kg. butyraldehyde (10 percent of the total amount). The temperature in said four vessels is maintained at 37 to 39° C. The average time of stay in the four vessels amounts to 11, 10, 9.5, and 9 minutes, respectively.

The mixture flowing from the fourth vessel is continuously acidified with formic acid to a pH of 5.5 to 6.0. After the usual working up 82.5 kg. (97.2 percent of theory) of crude trimethylol-propane are obtained. 69.5 kg. (81.9 percent of theory) of distilled product with a solidification point of 59° C. are obtained therefrom.

Example 3

170 kg. formaldehyde (30 percent by weight aqueous solution), 53.6 kg. sodium hydroxide solution (96 percent Ca(OH)$_2$, 54.3 percent of the total amount) and 13.9 kg. propionic aldehyde (95 percent C$_4$H$_8$O, 41 percent of the total amount) per hour are introduced continuously into a reaction vessel provided with a stirring device.

The mixture is continuously circulated through a cooler, i. e. is pumped out of and back into the vessel and flows from the first container through an overflow into a second container provided with stirring means into which second container there are added continuously further 45.0 kg. sodium hydroxide solution (45.7 percent of the total amount) and 15.3 kg. propionic aldehyde (45.0 percent of the total amount) per hour. This mixture is also circulated by a pump through a cooler and passed from the second container into a third vessel into which there are added continuously 4.8 kg. propionic aldehyde (14.0 percent of the total amount) per hour. The temperature in all three vessels is maintained at 53–55° C. The average time of stay in the three vessels amounts to 11, 9 and 9 minutes, respectively.

The mixture is subsequently continuously acidified with formic acid to a pH of 5.5 to 6.0. After the usual working-up, 57.5 kg. (90 percent of theory) of crude trimethylol-ethane are obtained.

The other polyhydric alcohols mentioned above can be produced in an analogous manner.

We claim:

1. In the process for continous production of polyhydric alcohols by condensation of formaldehyde with a higher aliphatic aldehyde selected from the group consisting of acetaldehyde, propionic aldehyde, butyraldehyde, isovaleryl aldehyde and oenanthic aldehyde, in the presence of a condensation agent selected from the group consisting of an aqueous lithium, sodium and potassium hydroxide solution and an aqueous calcium and barium hydroxide suspension, the improvement of carrying out that process at a temperature from about 30° to about 90° C. in several stages with the use of 100 to about 110 percent of the theoretical amount of formaldehyde in such a manner that in the first stage the total amount of formaldehyde is introduced together with between about 40 and about 70 percent of the theoretical amount of the condensation agent and between about 30 and about 50 percent of the higher aliphatic aldehyde, the condensation agent, however, being present in excess with respect to said amount of the higher aliphatic aldehyde, in at least one subsequent stage between about 60 and about 30 percent of the theoretical amount of the condensation agent and between about 45 and 30 percent of the theoretical amount of the higher aliphatic aldehyde are added, the condensation agent again present in excess with respect to said higher aliphatic aldehyde, and finally, in a last stage, the remainder of said higher aliphatic aldehyde is added.

2. Process according to claim 1, wherein the formaldehyde is used in the theoretical amount.

3. Process according to claim 1, wherein the first stage about 40–70 percent of the condensation agent and about 30–50 percent of the higher aliphatic aldehyde, in the second stage about 60–30 percent of the condensation agent and 45–30 percent of the higher aliphatic aldehyde and in the third stage the remainder of the higher aliphatic aldehyde are introduced.

References Cited by the Examiner

UNITED STATES PATENTS

| | | | |
|---|---|---|---|
| 2,011,589 | 8/35 | Paterson | 260—635 |
| 2,468,718 | 4/46 | Wyler | 260—635 |
| 2,790,837 | 4/57 | Robeson | 260—635 |

JOSEPH R. LIBERMAN, *Primary Examiner.*

LEON ZITVER, *Examiner.*